Sept. 1, 1931.  E. SCHUSTER  1,821,278
VACUUM EVAPORATING APPARATUS
Filed Aug. 12, 1929  7 Sheets-Sheet 1

E. Schuster
INVENTOR

By: Marli & Clew
Attys.

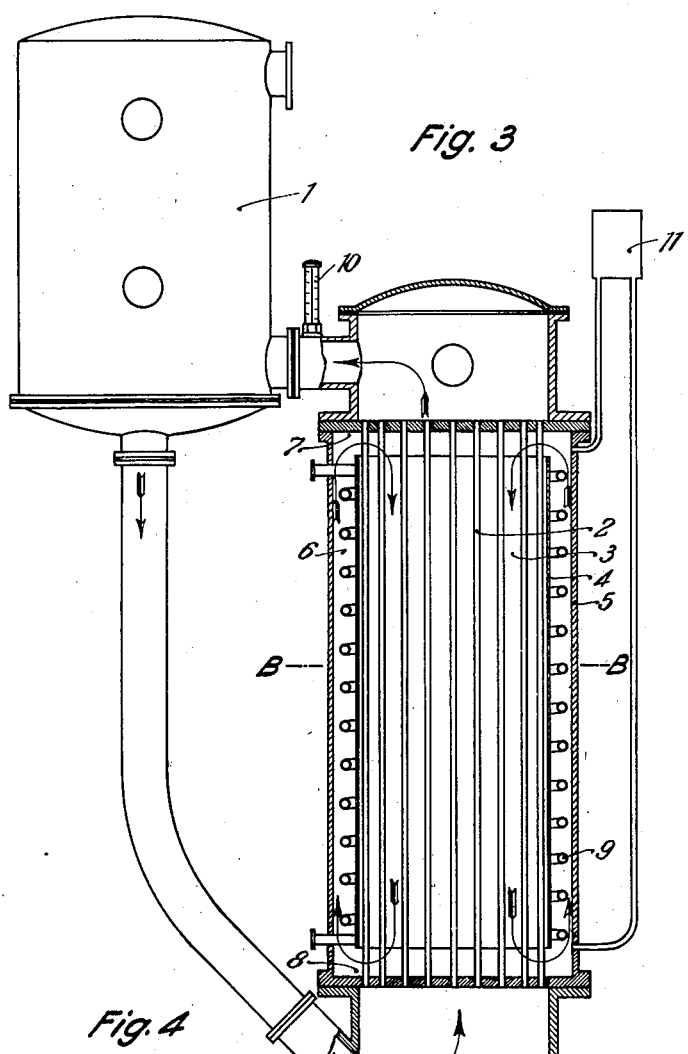
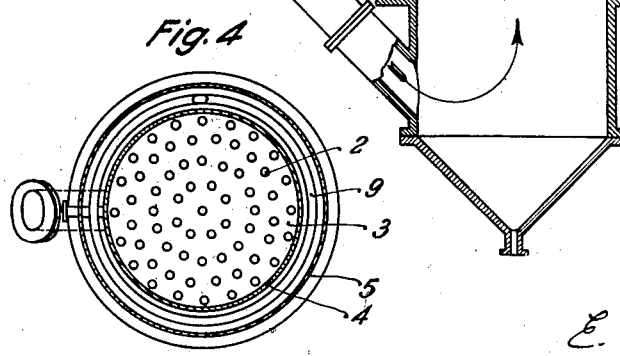

Sept. 1, 1931. E. SCHUSTER 1,821,278
VACUUM EVAPORATING APPARATUS
Filed Aug. 12, 1929 7 Sheets-Sheet 3
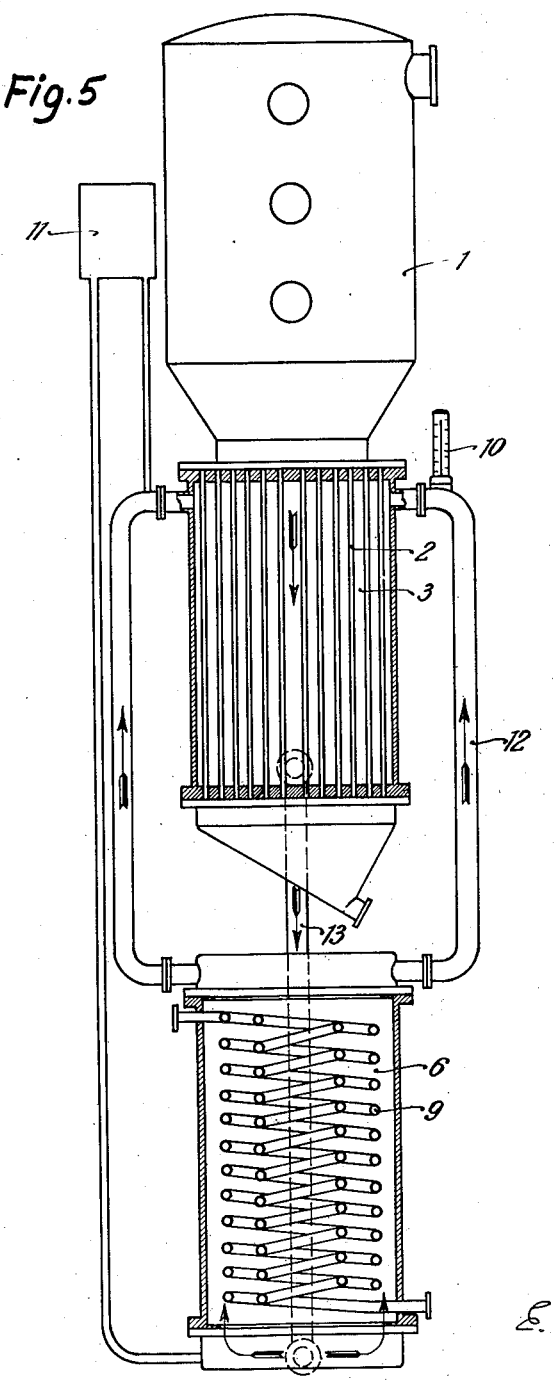

Sept. 1, 1931.  E. SCHUSTER  1,821,278
VACUUM EVAPORATING APPARATUS
Filed Aug. 12, 1929  7 Sheets-Sheet 4
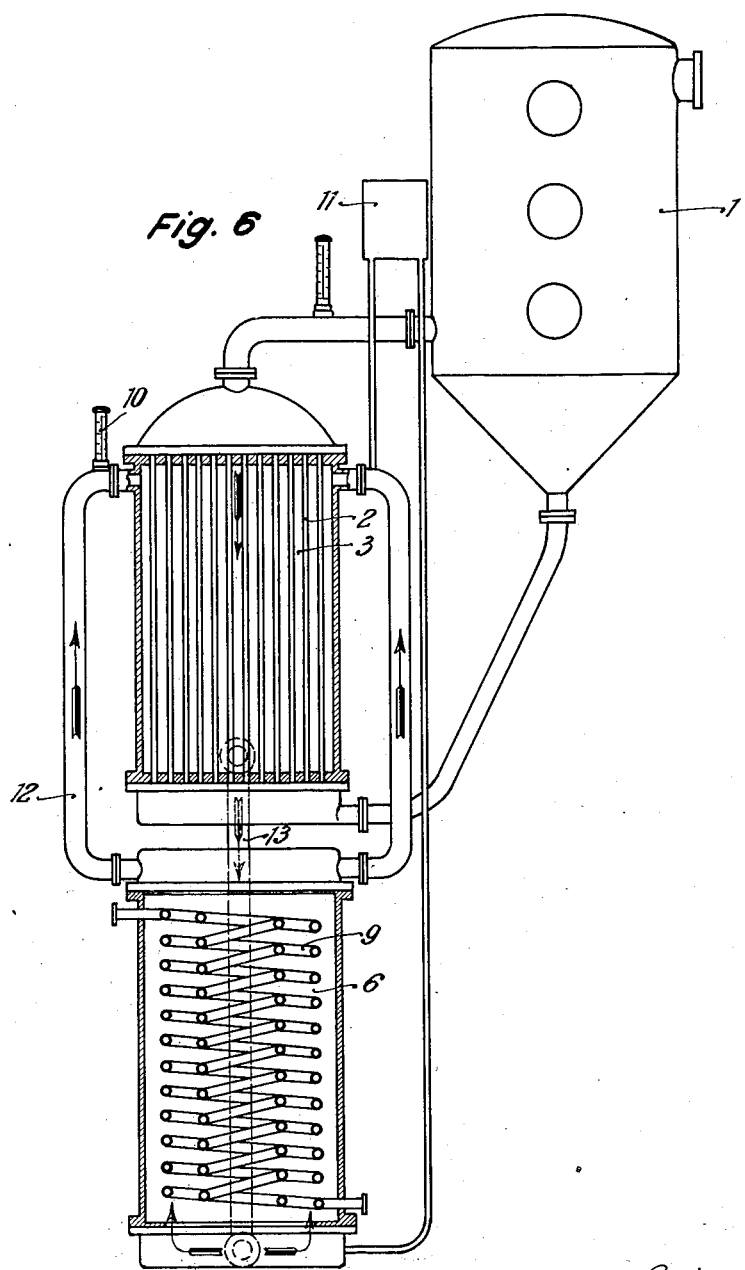

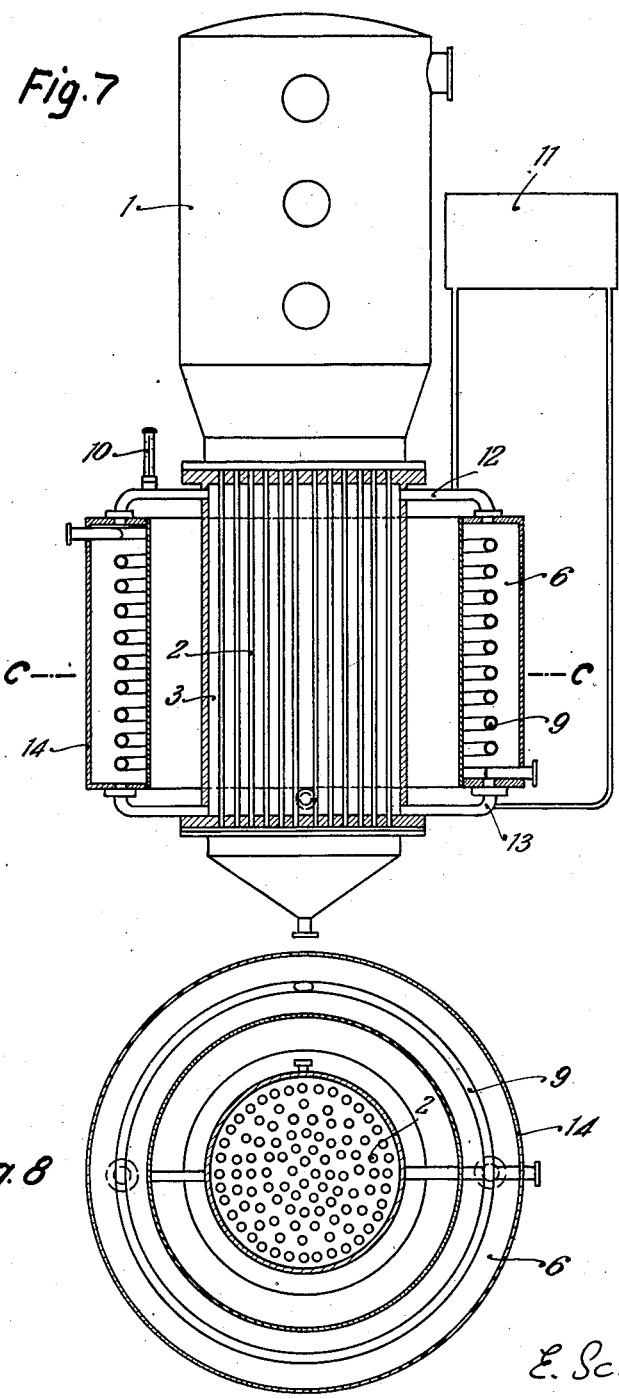

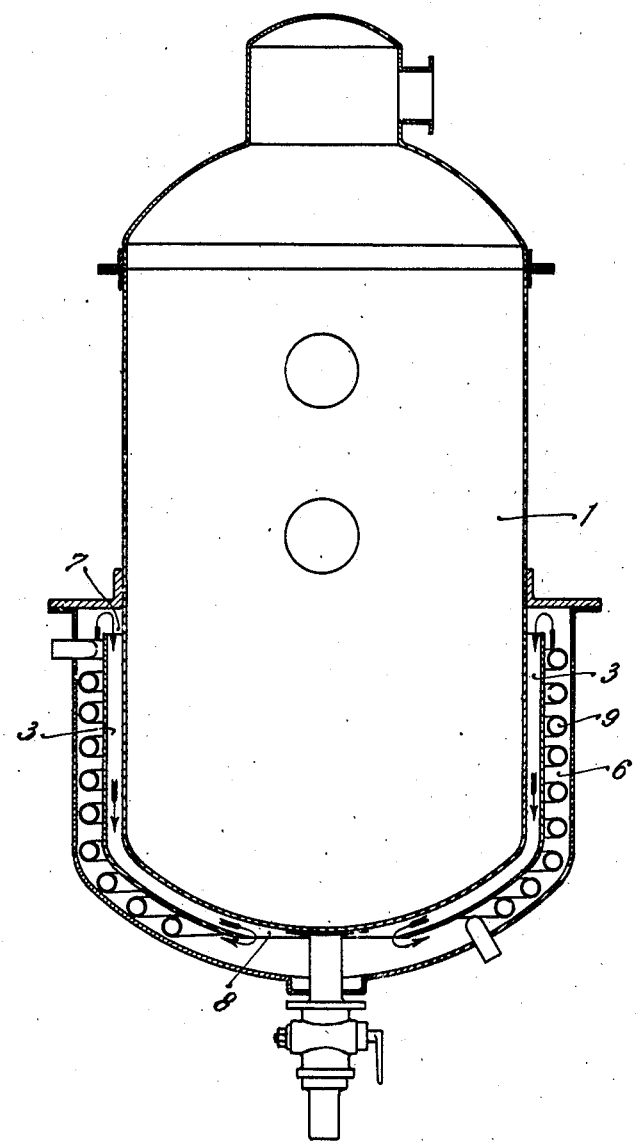

Patented Sept. 1, 1931

1,821,278

UNITED STATES PATENT OFFICE

ERNST SCHUSTER, OF BREMEN, GERMANY

VACUUM EVAPORATING APPARATUS

Application filed August 12, 1929, Serial No. 385,166, and in Germany March 5, 1928.

In the known kinds of vacuum evaporating apparatus the liquid to be evaporated is usually heated by heating a steam jacket or a tubular heating body with vapours under pressure. With liquids which are very sensitive to heat this method of heating has the drawback that they readily adhere or get burnt on. This results in the heating effect and the consequent evaporating duty deteriorating after a short time. In addition to this the heat sensitive liquids easily acquire properties which reduce their value, owing to the heating body being heated with vapours under pressure. Thus, for instance, in the case of milk condensed with apparatus of this kind the milk acquires a strong boiled taste. This disadvantage is to be accounted for in the first place through the difference in temperature between the heated steam jacket or tubular heating body and the solution to be evaporated being too great. When a heat sensitive liquid, such as milk, is being evaporated under a vacuum of 70 cms. of mercury, this is done with the object of not heating it above 50° C. The steam-heated surfaces are however mostly heated with live steam at at lease 110° C. These great differences in temperature result in the disadvantages referred to above.

The present invention has for its object to overcome these difficulties. The invention consists in this that in a vacuum evaporating apparatus in which the solution is evaporated by means of a heating liquid the heating space containing the tubes through which the solution to be evaporated flows is separated from the preheating space for heating the heating liquid and is in communication with the same only through openings at the top and bottom, such that the heating liquid, without being guided in pipes, circulates in a positive manner flowing along the tubes or the wall of the vessel. In consequence of this the heat-sensitive liquids to be evaporated do not deteriorate.

In the accompanying drawings, Figures 1 to 10 show various constructional examples of the invention.

Figure 1:
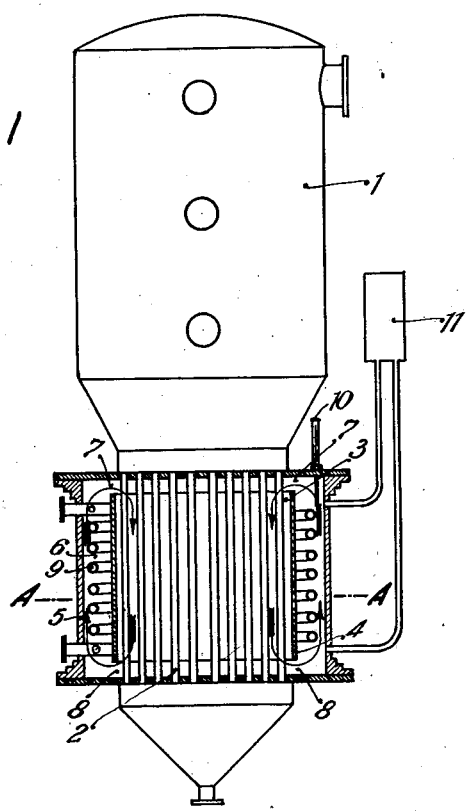
Figure 2:
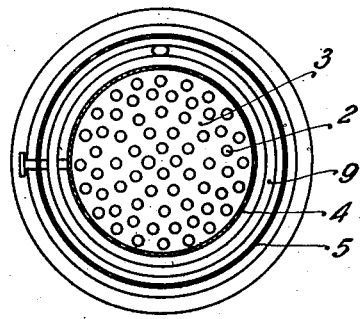

According to Figures 1 and 2 of which the latter is a section on line A—A of Figure 1 the tubes 2, which communicate with the vacuum evaporating apparatus 1 and through which the solution to be evaporated flows, are disposed in a heating chamber 3 formed by a cylinder 4 which surrounds the vertical tubes 2. The cylinder 4 is disposed in a suitable manner in a container 5, such that between the annular space 6 and the inner space 3, through which the tubes 2 extend, upper and lower openings 7 and 8 are formed. In the annular space 6 itself is a heating coil 9 which heats the heating liquid in the preheating space 6. The heating liquid is consequently caused to circulate positively in the manner indicated by the arrows through the upper openings 7 into the heating chamber 3 and in the latter along the tubes 2, without being conducted in special pipes. Owing to cooling the heating liquid in the heating chamber 3 sinks downwards and passes through the lower openings 8 back into the preheating space 6 where it is again heated up by the heating coil 9. A thermometer 10 disposed in the preheating space 6 allows of the temperature of the heating liquid being regulated. The overflow arrangement 11 ensures that there shall be no pressure in the space containing the heating liquid and which must always be kept full.

According to Figures 3 and 4 of which Figure 4 is a section on line B—B of Figure 3 the tubes 2 through which the liquid to be evaporated flows are arranged laterally of the evaporating apparatus 1. It will be seen from the arrows in the figures that this apparatus is a rapidly circulating counterflow vacuum evaporating apparatus. For the rest, the construction of the apparatus is substantially similar to that in Figures 1 and 2. The heating coil 9 which serves the purpose of heating the heating liquid is disposed in the anunular space 6 formed by a cylinder being inserted in a container 5, top and bottom openings 7 and 8 being provided between the heating chamber 3 and the preheating space 6 for producing a circulatory motion of the heating liquid.

According to Figure 5 the heating chamber 3 is separated in contradistinction to the constructional forms hitherto described from the preheating space 6 in which is disposed the coil 9 for heating the heating liquid and communicates with the space 6 only through the pipes 12 and 13. In this case the heating liquid flows through the pipe 12 from above into the chamber 3, where it circulates along the tubes 2, returning to the preheating space 6 through the pipe 13.

The vacuum evaporating apparatus shown in Figure 6 has separate heating and preheating spaces, as in the arrangement shown in Figure 5 and differs from the latter only in this, that the liquid flowing through the tubes 2 is conveyed through the tubes on the counterflow principle.

Figure 9:
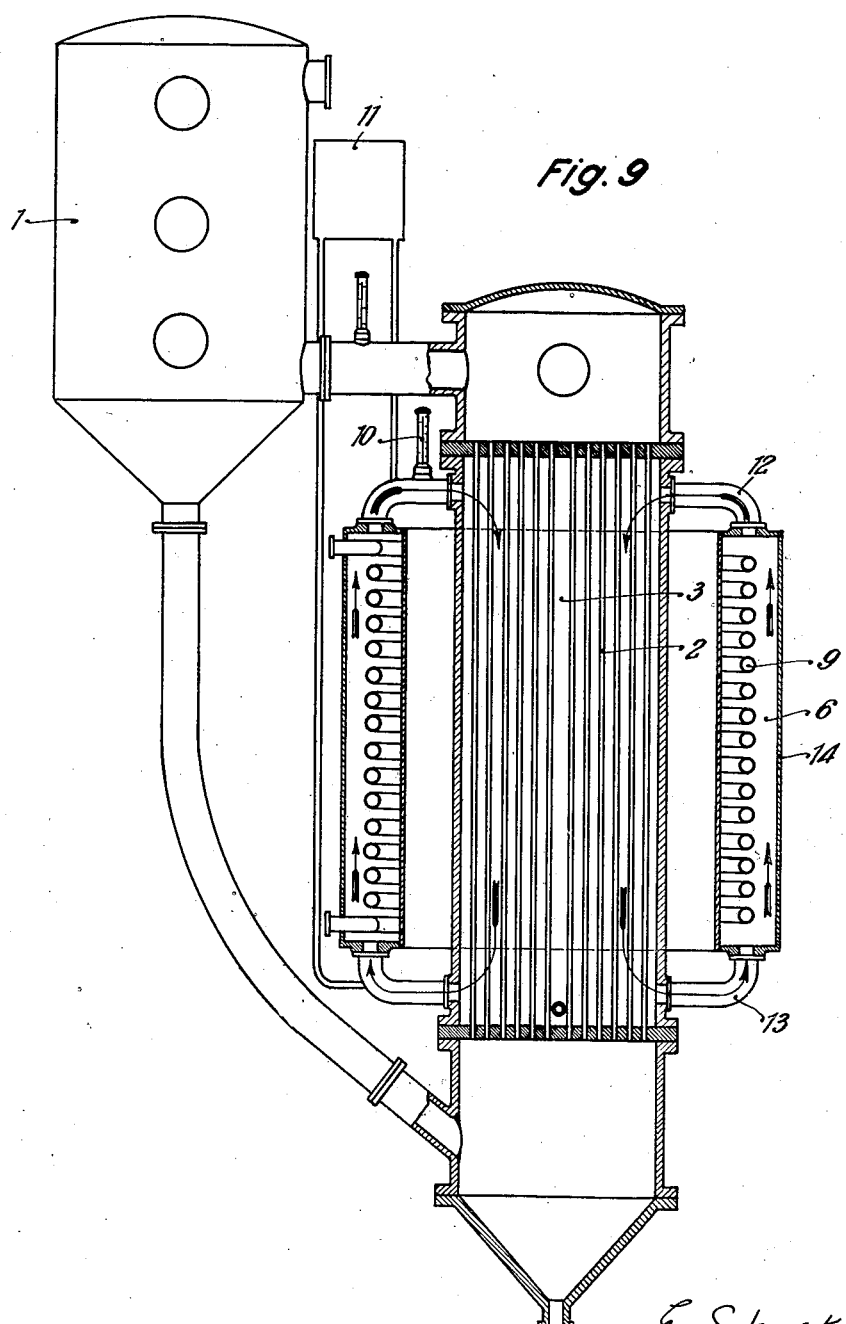

In the vacuum evaporating apparatus shown in Figures 7 to 9, of which the former works on the parallel flow and the latter on the counterflow principle the heating chamber 3 is also separate from the preheating space 6 and is connected with the latter only through separate pipes 12 and 13. While in the constructional form shown in Figures 5 and 6 the heating and preheating spaces are arranged one below the other, according to Figures 7 and 8 these spaces are concentric with one another. The heating chamber 3 is surrounded at a certain distance by a double-walled closed cylindrical vessel 14 containing the heating coil. Such an arrangement of the heating coil 9 produces even with a vacuum evaporating apparatus with a screwed down tubular heating body a particularly good circulation of the heating liquid.

In the constructional form shown in Figure 10 a vacuum evaporating apparatus is shown, which differs from those shown in Figures 1 to 8 by not having a tubular heating body but being provided with jacket heating. The liquid to be evaporated is in the vessel 1, the lower part of the wall of which is enclosed in the heating chamber 3 which is in communication through upper and lower openings 7 and 8 with the preheating space 6. The heating liquid heated by the heating coil circulates in a positive manner as shown by the arrows along the wall of the container 1.

What I claim is:

1. A vacuum evaporating apparatus in which the solution to be treated is evaporated by means of a heating liquid, comprising in combination a heating chamber, a circulatory system disposed in the said heating chamber for the circulation of the said solution, a preheating space for heating the heating liquid, which is divided off from the said heating chamber, heating means in said preheating space and communicating openings at the top and bottom between the preheating space and the heating chamber, such that the heating liquid can circulate without being conducted in piping in a positive manner along the walls of the circulating system, as and for the purpose set forth.

2. A vacuum evaporating apparatus in which the solution to be treated is evaporated by means of a heating liquid, comprising in combination a heating chamber, a circulatory system disposed in the said heating chamber for the circulation of the said solution, a preheating space for heating the heating liquid, surrounding the said circulatory system, a container surrounding the circulatory system and the preheating space for the heating liquid, a hollow cylinder surrounding the circulatory system, a heating coil in the annular space between the wall of the container and the hollow cylinder and communicating openings at the top and bottom between the preheating space and the heating chamber, such that the heating liquid can circulate without being conducted in piping in a positive manner along the walls of the circulating system, as and for the purpose set forth.

3. A vacuum evaporating apparatus in which the solution to be treated is evaporated by means of a heating liquid, including a heating chamber having passages for said solution, a circulatory system for the circulation of said heating liquid constituted in part by said heating chamber, a preheating space, a heating element in said preheating space for heating the heating liquid, and means establishing communication between the heating space and the heating chamber at different levels to effect circulation of the liquid heated by the heating element through the preheating space and heating chamber.

4. A vacuum evaporating apparatus in which the solution to be treated is evaporated by means of a heating liquid, including a heating chamber having passages for said solution, a circulatory system for the circulation of said heating liquid constituted in part by said heating chamber, a preheating space, a heating element in said preheating space for heating the heating liquid, and means establishing communication between the heating space and the heating chamber at different levels to effect circulation of the liquid heated by the heating element through the preheating space and heating chamber, and a reservoir communicating with the circulatory system and disposed at a higher level than the preheating space and heating chamber.

In testimony whereof I have signed my name to this specification.

ERNST SCHUSTER.